United States Patent
Holt

(10) Patent No.: US 7,740,255 B2
(45) Date of Patent: Jun. 22, 2010

(54) SUSPENSION BEAM WITH CAPTURED AXLE

(75) Inventor: Mark Holt, Springfield, MO (US)

(73) Assignee: Ridewell Corporation, Springfield, MO (US)

( * ) Notice: Subject to any disclaimer, the term of this patent is extended or adjusted under 35 U.S.C. 154(b) by 522 days.

(21) Appl. No.: 11/725,080

(22) Filed: Mar. 16, 2007

(65) Prior Publication Data

US 2008/0224435 A1 Sep. 18, 2008

(51) Int. Cl.
*B60G 3/12* (2006.01)

(52) U.S. Cl. .......................... 280/124.128; 280/124.11; 280/124.153; 280/124.116

(58) Field of Classification Search .......... 280/124.116, 280/124.128, 124.129, 124.13, 124.153, 280/124.157
See application file for complete search history.

(56) References Cited

U.S. PATENT DOCUMENTS

| 5,366,237 | A | | 11/1994 | Dilling |
| 5,690,353 | A | | 11/1997 | Vandenberg |
| 5,778,798 | A | * | 7/1998 | VanDenberg ............ 105/215.2 |
| 5,988,672 | A | * | 11/1999 | VanDenberg ................ 280/683 |
| 6,508,482 | B2 | | 1/2003 | Pierce |
| 6,557,875 | B2 | | 5/2003 | Schlosser |
| 6,827,360 | B2 | | 12/2004 | Chan |
| 7,178,816 | B2 | * | 2/2007 | Chan et al. ............ 280/124.116 |
| 7,540,513 | B2 | * | 6/2009 | Reineck ................ 280/124.106 |
| 2003/0067133 | A1 | | 4/2003 | Eveley |
| 2003/0146592 | A1 | * | 8/2003 | Chalin et al. ........... 280/124.116 |
| 2004/0080132 | A1 | * | 4/2004 | Chan et al. .............. 280/124.11 |
| 2005/0082783 | A1 | | 4/2005 | Ramsey et al. |
| 2006/0033304 | A1 | * | 2/2006 | Saieg et al. ............ 280/124.128 |
| 2006/0163834 | A1 | | 7/2006 | Brereton et al. |
| 2006/0244234 | A1 | | 11/2006 | Ramsey |
| 2007/0176385 | A1 | * | 8/2007 | Barton et al. .......... 280/124.116 |

FOREIGN PATENT DOCUMENTS

| EP | 1842700 A | 10/2007 |
| WO | 2008017351 A | 2/2008 |

OTHER PUBLICATIONS

International Search Report and Written Opinion issued in related PCT Patent Application Serial No. PCT/US2008/057216, dated Dec. 16, 2008, 16 pages.
Partial International Search Report issued in related PCT Patent Application Serial No. PCT/US2008/057216, dated Jul. 24, 2008, 4 pages.

* cited by examiner

*Primary Examiner*—Paul N Dickson
*Assistant Examiner*—James English
(74) *Attorney, Agent, or Firm*—Lathrop & Gage LLP

(57) ABSTRACT

A suspension beam with a captured axle is described, including a top and bottom plate, a pivot mount, and a spring mount, and side plates. Optional embodiments include an axle sleeve, multiple top and bottom plates, a u-shaped member in place of the side plates. The pivot mount includes a bush housing and a bush housing clamp. The side walls may be recessed, flush or outboard with respect to the top and bottom plates. The top and bottom plates are directly attached to the axle or axle sleeve, and to the pivot mount.

13 Claims, 10 Drawing Sheets

MULTIPLE PLATE CONFIGURATION 164

MULTIPLE PLATE CONFIGURATION 176

SUSPENSION BEAM WITH CAPTURED AXLE

SUMMARY AND BACKGROUND OF THE INVENTION

This invention generally relates to a suspension beam for a vehicle, and more particularly to one having a captured axle. The suspension beam, also known as a control arm, and axle assembly of this invention is particularly directed to one wherein the upper and lower beam plates directly engage and retain an axle mounted substantially perpendicular to the beam. Additional structures, such as side plates or rigid webbing would generally be used to increase overall beam stability and rigidity.

The suspension beam assembly of the instant invention has multiple applications but would generally be used for heavy duty trucks and trailers. The beam assembly is adaptable for use with a multitude of hanger types as well as with air ride resilient spring assemblies interposed between the beam and a vehicle chassis. The beam assembly can be used in both overslung and underslung applications, and in certain applications may be mounted in a leading or trailing orientation with respect to its connection to the vehicle chassis.

Generally, the suspension beam will be mounted to a pivot depending from a vehicle chassis. The beam itself extends away from the pivotal attachment a pre-determined length. Any variety of suspension members, such as resilient air bags, coil springs or the like may be mounted between the beam and the vehicle chassis. Further, an axle is generally mounted perpendicular to a pair of spaced apart suspension beams.

It is the attachment of the axle to the beams which is the novel feature of the instant invention. It is highly desirable to have a rigid axle to beam connection which substantially eliminates up and down flexation as well as side to side deflection during suspension articulation. A proper rigid axle-to-beam connection further limits unwanted suspension tracking and suspension deflection as the vehicle encounters uneven surfaces, and as it maneuvers through turns.

Efforts to perfect the axle to beam connection have included positioning the axle between the upper beam member and a separate lower beam member in a clam shell orientation as well as passing the axle directly through the side plates of the beam. A variety of axle sleeves or collars have also been utilized to increase the area of connection between the beam plates and the axle and to enhance the rigidity of the axle-to-beam connection point. Some of the prior art particular to the axle-to-beam connection includes U.S. Pat. No. 5,366,237 to Dilling and U.S. Pat. No. 6,557,875 to Schlosser. Certain prior art suspension beams included cut-out portions into which an axle was positioned and then fastened. Examples of these axle to beam connections can be seen at U.S. Pat. No. 6,827,360 to Chan and U.S. Pat. No. 6,508,482 to Pierce.

An additional problem with typical axle to beam connections in control arm applications is that the forces imparted on the axle may actually stress the cross-sectional shape such that the axle becomes out of round. Numerous forces are imparted on the axle during vehicle operation and including centrifugal force at the vehicle center of gravity which is proportionate to the radius of the curve or corner, as the vehicle maneuvers around a corner, and the vehicle speed squared. This action creates a roll moment proportionate to the height of the center of gravity off the ground and the magnitude of the centrifugal force. Since the vehicle is in a steady state condition, the roll moment is resisted at the tire to road interface by an equal but opposite moment created by unloading the tire of one side of the vehicle by a force and increasing the load on the opposite side tire by the same force magnitude. The roll moment causes the vehicle to lean in one direction which imparts excessive directional force at an axle to beam connection point. Further, tire deflection becomes proportionate to the force magnitude and the radial spring rate of the tires. The forces caused by the roll moment must be transferred from the vehicle body through the suspension into the axles and the tires, and then to the road surface. Transference of the load from the suspension to the axle varies depending on the orientation of the control arm respective its connection to the vehicle.

The forces which are imparted on the axle to beam connection can be changed by altering the method of connecting the axle to the beam. It is desirable to control the application of forces during vehicle maneuvering to eliminate or at least limit excessive forces at any isolated point at the axle to beam connection. A very good description of the overall force application to the axle to beam connection can be found in U.S. Pat. No. 5,366,237 to Dilling. The Dilling patent discloses an axle beam with two spaced apart side plates. A bore is formed completely through the spaced apart side plates in horizontal alignment. The axle is passed through the bore and fixed therein by weldment or other conventional means. As explained in the Dilling patent, this orientation of axle to beam connection allows control of the forces imparted during vehicle maneuvering and limits the application of centrifugal forces as well as side to side deflection. One disadvantage of this orientation is the transference of force between the axle and the beam side plates, specifically along the portion of the side plate disposed between the axle and the upper and lower beam plates. As stated in the Dilling patent, however, the invention achieves its purpose of limiting forces at the axle to beam connection by surrounding the axle with a rigid connection substantially 360 degrees around its circumference. This assertedly prohibits the axle from being stressed out of its manufactured cross-section shape thereby limiting the likelihood of "out of round" from occurring. As stated, this orientation also eliminates the need for additional mechanical fasteners such as U-bolts. As with other prior art configurations, an axle sleeve is sometimes used to further increase rigidity of the connection thereby limiting bending and torquenal forces as the axle to beam connection points.

The instant invention provides an improved suspension beam that further controls the imparting of torsional and bending forces at the axle to beam connection points by eliminating the side plate span between the circumference of the axle and the top and bottom plates of each suspension beam. Each suspension beam includes a first end and a spaced apart second end. At the first end of the suspension beam, a pivotal mount is formed for retaining a resilient bushing which is then inserted into and pivotally attached to a bracket depending from the vehicle chassis. At the second end of the beam, a mount is provided for a resilient air suspension member. It is understood that the mount may be oriented for both overslung and underslung applications.

Between the pivot bushing of the first end and the air bag mount of the second end, a rigid top plate and rigid bottom plate are provided. Intermediate to the ends, an axle is positioned and captured directly between the top plate and bottom plate. It is preferable that the top plate and bottom plate are slightly arced about the periphery of the axle to increase the axle to beam connection span. Because the top plate and bottom plate of the beam are directly connected to the axle, the axis of rotation of the axle lies on the centerline of the beam. Side plates would generally be inserted and fixed between the pivot bushing and the axle as well as between the axle and the second end. This further increases the rigidity and stabilizes the beam. Further, by directly attaching the top plate and bottom plates to the axle, there is no side wall flexing between the axle and those top and bottom plates which would induce stress.

The top and bottom plates both extend from the axle in directions substantially tangent to the axle and are in contact with the surface of the axle along a distance. That distance can be varied by forming a slight arc in the top plate or the bottom plate or both plates. Accordingly, stresses and forces imparted on the axle during vehicle articulation are transferred directly from the axle to the top and bottom plates which then carry those stresses. Further, this orientation directs forces from the axle substantially to the center line of the suspension beam rather than the sidewalls of the beam directly above and below the axle.

This orientation also facilitates ease of manufacture because no holes have to be bored through the beam sidewalls. Positioning an axle through bores in the sidewalls requires a certain degree of tolerance in those bores to facilitate the passage of the axle. Further, tolerance must be provided to allow weldment of the axle to the side plates. This necessity is eliminated by the instant invention.

In another configuration of the invention, the axle is trapped between the top and bottom plates, however, the additional side plates are replaced by a U-shaped member. It is known that the U-shaped member replacing side plates further limits side to side deflection during vehicle articulation.

The orientation of the captured axle with direct connection between the top and bottom plates in the axle surface creates a symmetrical beam. The symmetrical centerline of the axle and beam further allows uniform clearance for disc brakes, actuators, brake camshafts and other accessories.

In some applications it may be desirable and preferable to have an actual sleeve over the axle to eliminate the direct weldment of the top and bottom plates to the axle surface. It is understood, however, the sleeve is optional.

In applications where an axle sleeve is used, the axle sleeve may be flush to the beam sidewalls, or may be mounted inboard or outboard the beam sidewalls. Further, the axle sleeve can be manufactured in one or more pieces and may be provided with windows to enhance weldment of the sleeve to axle or the sleeve to beam.

The sidewalls of the beam may also be replaced by a single center wall which creates a substantial I-beam configuration when the center plate is connected to the top plate and bottom plate of the beam.

In yet another embodiment of the invention, multiple top and bottom plates may be used. The axle may be captured between a first top plate and a first bottom plate. The first top plate then overlies a second top plate while the first bottom plate overlies a second bottom plate. It is further understood the top or bottom plates can be wrapped about the circumference of the axle to increase the surface contact of the axle to the top and bottom plates.

DETAILED DESCRIPTION

Figure 1:
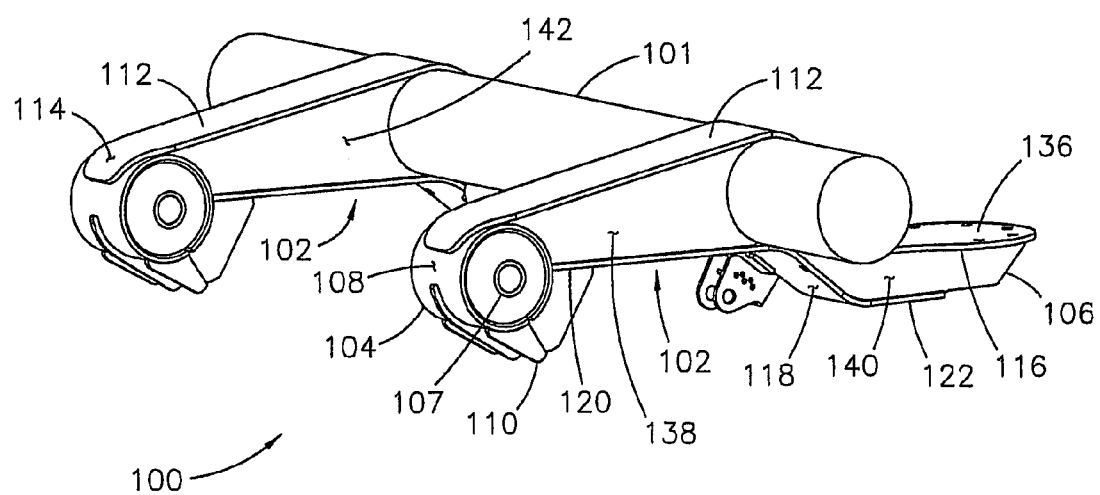
FIG. 1 is a perspective view of two suspension beams attached to an axle.

Referring now generally to the figures, a suspension beam assembly 100 is provided which includes an axle 101 mounted perpendicularly between a pair of spaced apart suspension beams 102. Each suspension beam includes a first end 104 and a spaced apart second end 106. At the first end 104 of the suspension beam 102, a pivot mount 107 is provided to attach the beam 102 to a vehicle chassis or to a suspension bracket depending from a vehicle chassis. It is preferred that the pivot mount 107 provides for insertion and retention of a resilient bushing, which is then positioned on and mounted to the vehicle chassis or the suspension bracket. The pivot mount 107 may include a resilient bushing housing 108 for inserting the resilient bushing, and a resilient bushing housing clamp 110 for retaining the resilient bushing.

At the second end 106 of the suspension beam 102, a mount 136 would generally be provided for positioning a resilient air bag between the vehicle chassis and the beam.

The suspension beam 102 further includes a top plate 112, with a pivot end 114 and a spring end 116, and a bottom plate 118, including a pivot end 120 and a spring end 122. The top plate 112 and bottom plate 118 extend between the first end 104 and the second end 106 of the suspension beam 102. A vehicle axle 101 is positioned between the top plate 112 and bottom plate 118 and is mounted directly thereto by weldment or other suitable means. Side plates 138, 140, 142 and 144 are then inserted between the top plate 112 and bottom plate 118 both between the first end 104 of the beam and the axle 124, and between the axle 101 and the second end 106 of the beam.

In another embodiment of the invention, an axle sleeve 126 is positioned over the axle 101 at the point where it is captured between the top plate 112 and the bottom plate 118 of the suspension beam 102.

In yet another embodiment of the invention, only a single side plate is positioned between the top plate 112 and bottom plate 118 of the suspension beam 102 to create essentially an I-beam configuration.

Another embodiment of the invention utilizes a U-shaped plate member 158 rather than side plates 138 and 142. The apex or bottom of the U may be oriented either upward or downward and fastened to the adjacent plate whether it be the top plate 112 or bottom plate 118.

In yet another embodiment of the invention, multiple top plates and bottom plates are contemplated. As shown in the figures, a first top plate is mounted between the bushing housing and the axle. A second top plate is then positioned generally downward from the first top plate and spans between the axle surface and the second end of the beam. It is understood that the orientation of the two top plates can be reversed. Further, the top plates can have varying degrees of overlap. It is also understood that the bottom plates can be mounted in substantially the same orientation as the two top plates or can be reversed in orientation depending upon the need and application.

Referring now specifically to FIG. 1, an underslung suspension beam assembly 100 is provided, including an axle 101 and two suspension beams 102. The suspension beams 102 are spaced apart along and attached to the axle 101. The suspension beam assembly is mounted to a truck or trailer at pivot mounts 107, and supported at spring seats 136.

The suspension beam has a top plate 112 and bottom plate 118. The top plate 112 in this embodiment is substantially flat with curved pivot end 114 and includes a spring seat 136 located substantially below an axle 101. The top plate 112 and bottom plate 118 attach to the bush housing 108 at a first end and to the axle 101 at a second end. The curved pivot end 114 contacts and is attached to the pivot housing 108 along an arc defined by the curved end of the top plate 112. The suspension beam also includes side plates 138 and 142 attached to the top plate 112 to the bottom plate 118 along a line parallel to and recessed from the edges of top plate 112 and bottom plate 118. The side plates 138 and 142 are substantially perpendicular to top plate 112 and bottom plate 118. In other embodiments the side plates 138 and 142 may be disposed flush with the top plate 112 and bottom plate 118, or outboard and extending above and below top plate 112 and bottom plate 118.

Continuing to refer to FIG. 1, top plate 112 and bottom plate 118 are also attached to axle 101 at a point near the spring end of said plates. Said plates may be curved to contact the axle 101 along an arc to increase the strength of the attachment.

Figure 3:
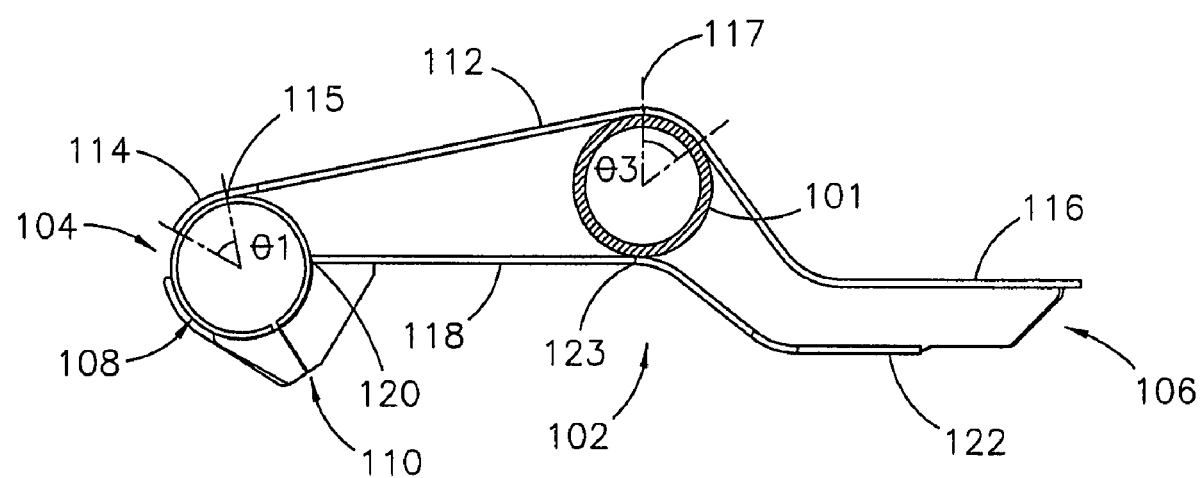
FIG. 3 is a side view of a first embodiment.

Referring now specifically to FIG. 3, the suspension beam 102 is shown in an exploded view. The top plate 112 and the bottom plate 118 are attached at pivot ends 114 and 120, respectively, to the pivot mount 108. The top plate 112 and bottom plate 118 are attached to an axle 101 at a point between the spring ends 116 and 122, respectively, and pivot ends 114 and 120.

In this embodiment, the pivot mount 107 includes a bush housing 108 and a bush retention clamp 110. The bush housing 108 is a circular cylinder divided by a slit extending the length of the bush housing, and allowing the bush housing 108 to flex slightly along its length. The bush retention clamp 110 includes multiple metal flanges and is attached to the outside surface of the bush housing 108. The metal flanges are disposed on either side of the slit in the bush housing 108.

Side plates 138 and 142 are disposed between pivot end 107 and axle 101 and substantially perpendicular to plates 112 and 118. The side plates 138 and 142 are attached to the top plate 112 and bottom plate 118 along a line parallel to and recessed from the top plate 112 and bottom plates 118.

Side plates 140 and 144 are disposed between the axle 101 and spring end 136 and are substantially perpendicular to plates 112 and 118. The side plates 140 and 144 are attached to the top plate 112 and the bottom plate 118 along a line parallel to and recessed from the top plate 112 and bottom plate 118.

Referring now specifically to FIG. 3, an embodiment is shown in a side elevation of the suspension beam 102. The pivot mount end 114 of top plate 112 is attached to bush housing 108 around an arc length subtended by an angle $\theta 1$, ranging from 15 degrees to 180 degrees from the point 115 of first attachment or contact between top plate 112 and bush housing 108. The top plate 112 is attached to the bush housing 108 by weldment or other means.

The top plate 112 is also attached to axle 101 and the attachment or contact between the top plate 112 and the axle 101 may extend from the point of contact 117 toward the spring end 116 of the top plate 112 along the outer surface of the axle 101 for an arc length subtended by an angle $\theta 3$. The angle $\theta 3$ may range between 0 and 135 degrees. The attachment point on the bottom surface of top plate 112 is disposed between the midpoint of the top plate 112 and the spring end 116 of the top plate 112.

Continuing to refer to FIG. 3, the edge of the bushing end 120 of the bottom plate 118 attaches via weldment or other conventional means to the outer surface of bush housing 108 and the bottom plate 118 extends substantially perpendicular to the tangent of the surface of the bush housing 108 at the point of attachment. The bottom plate 118 is attached to the axle 101 at a point 123 on the top surface of the plate 118 substantially at a point of curvature near the midpoint of the bottom plate 118.

Figure 4:
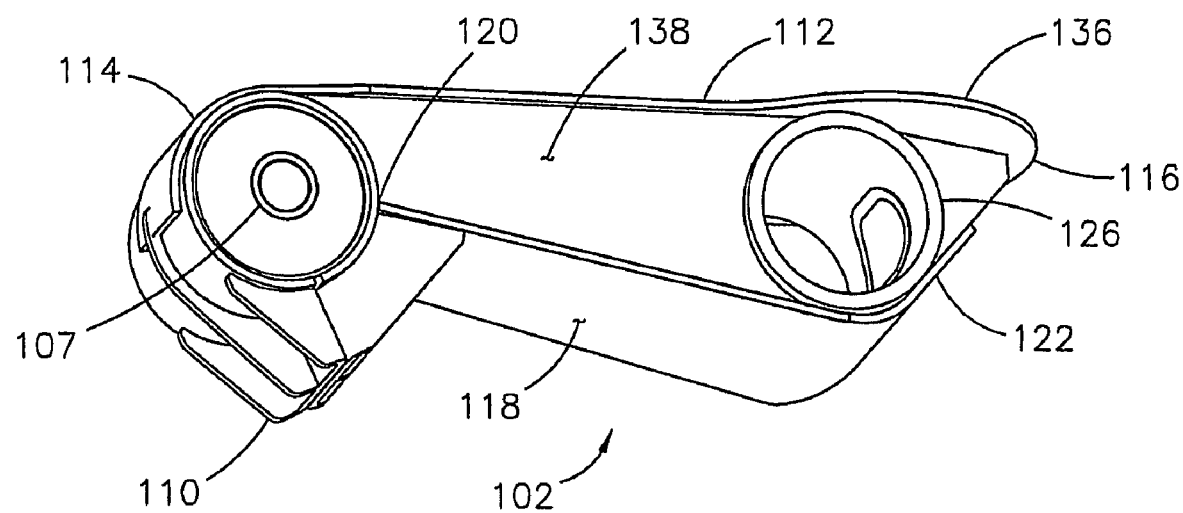
FIG. 4 is a perspective view of a second embodiment, showing an overslung suspension beam.

Referring now specifically to FIG. 4, a perspective view of an overslung embodiment of a suspension beam 102 is shown. The suspension beam has a top plate 112 and bottom plate 118. The top plate 112 in this embodiment is substantially flat with curved pivot mount end 114 and includes a spring seat 136 located substantially above an axle sleeve 126. The top plate 112 and bottom plate 118 attach to the pivot mount 107 at the pivot ends 114 and 120 respectively, and to the axle sleeve 126 at a point between the pivot mount 107 and the spring ends 116 and 122, respectively.

The suspension beam also includes side plates 138 and 142 joining the top plate 112 to the bottom plate 118, and to the pivot mount 107 and the axle sleeve 126.

Figure 5:
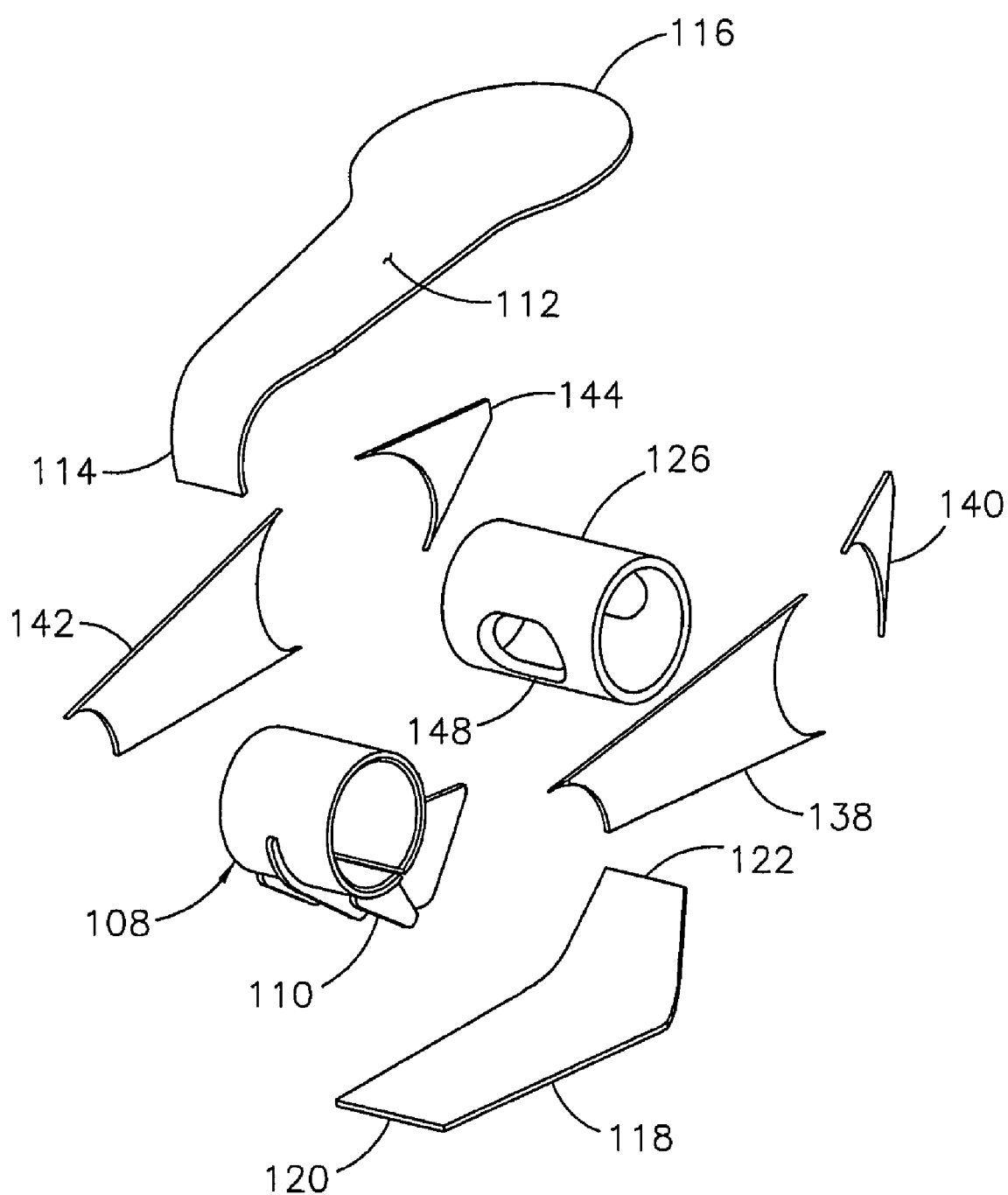
FIG. 5 is an exploded view of a second embodiment, showing an overslung suspension beam.

Referring now specifically to FIG. 5, the suspension beam 102 is shown in an exploded view. The top plate 112 and the bottom plate 118 are attached at pivot ends 114 and 120, respectively, to the pivot mount 108. The top plate 112 and bottom plate 118 are attached at a point near the spring ends 116 and 122, respectively, to an axle sleeve 126.

The axle sleeve 126 is substantially a circular cylinder with an inner surface and an outer surface and a length. The axle sleeve 126 substantially surrounds the surface of the axle 101, and extends along the axle 101 beyond sidewalls 138, 140, 142 and 144 approximately to the edges of top plate 112 and bottom plate 118.

The axle sleeve 126 may consist of multiple pieces. In one such embodiment, the axle sleeve 126 includes two half circular cylinders disposed in a clamshell configuration substantially surrounding the axle 101.

Axle sleeve 126 may also include one or more windows 148 disposed radially around the axle sleeve. In a preferred embodiment the axle sleeve includes two windows 148 disposed substantially opposed to each other on the outer surface of the sleeve, equidistant from either end of the cylinder along its length, and extending to the inner surface, thereby forming two openings in axle sleeve 126. The windows 148 may be substantially circular, oval, or rectangular in shape. The windows 148 provide access to axle 101 through axle sleeve 126 for attaching the axle sleeve to the axle 124 by weldment or other conventional means.

It is understood that the axle sleeve 126 may first be attached to the axle 101 by weldment or other conventional means before it is positioned and fixed between the top plate 112 and bottom plate 118 of the suspension beam 102. However, the axle sleeve 126 may also be premounted to the suspension beam 102 in the method described above with the axle 101 later inserted into the axle sleeve 126 and fastened thereto.

In this embodiment, the pivot mount 107 includes a bush housing 108 and a bush retention clamp 110. The bush housing 108 is a circular cylinder divided by a slit extending the length of the bush housing, and allowing the bush housing 108 to flex slightly. The bush retention clamp 110 includes multiple metal flanges and is attached to the outside surface of the bush housing 108. The metal flanges are disposed on either side of the slit in the bush housing 108.

Side plates 138 and 142 extend between and are attached to bush housing 108 and axle sleeve 126. The side plates 138 and 142 are also disposed substantially perpendicular to top plate 112 and bottom plate 118, and are attached thereto along a line substantially parallel to and slightly recessed from the edges of top plate 112 and bottom plate 118. Side plates 140 and 144 are to top plate 112 and bottom plate 118, and extend from axle sleeve 126 towards the spring end 116 of the top plate 112 and spring end 122 of the bottom plate 118.

Figure 6:
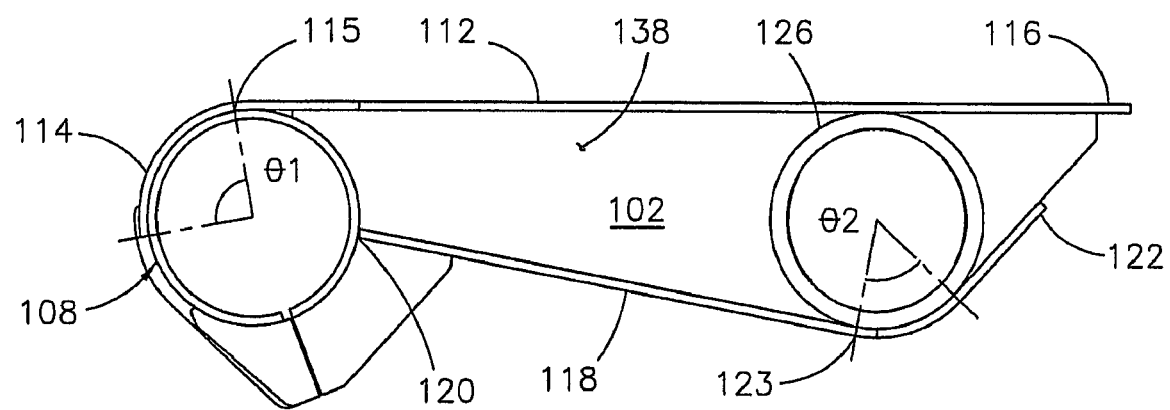
FIG. 6 is a side elevation view of a second embodiment, showing an overslung suspension beam.

Referring now specifically to FIG. 6, an embodiment is shown in a side elevation of the suspension beam 102. The pivot mount end 114 of top plate 112 is attached to the outer surface of bush housing 108 along an arc length subtended by an angle θ1, ranging from 15 degrees to 180 degrees from the point 115 of first attachment or contact between top plate 112 and bush housing 108. The top plate 112 is attached to the bush housing 108 by weldment or other means. The top plate 112 is also attached to axle sleeve 126 and extends substantially tangentially in both directions from the point of attachment to axle sleeve 126. The attachment point on the bottom surface of top plate 112 is disposed between the pivot end 114 and the spring end 116 of the top plate 112.

Continuing to refer to FIG. 6, the edge of the bushing end 120 of the bottom plate 118 attaches via weldment or other means to the outer surface of bush housing 108 and the bottom plate 118 extends substantially perpendicular to the tangent of the surface of the bush housing 108 at the point of attachment. The bottom plate 118 is attached to the axle sleeve 126 at a point 123 on the top surface of the plate 118 between the bushing end 120 and the spring end 122 of the bottom plate 118. The attachment or contact between the bottom plate 118 and the axle sleeve may extend from the point of contact 123 toward the spring end 122 of the bottom plate 118 along the circumference of the axle sleeve 126 for an arc length subtended by an angle θ2. The angle θ2 may range between 0 and 90 degrees.

Figure 7:
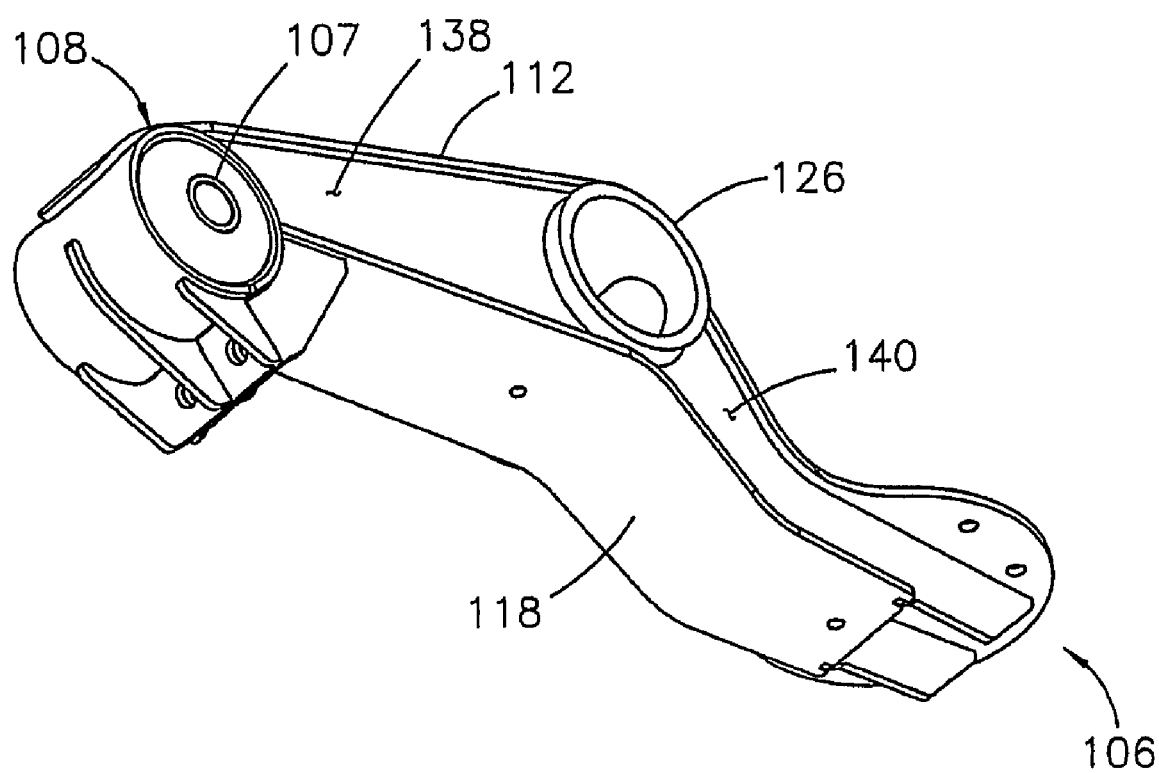
FIG. 7 is a perspective view of a third embodiment, showing an underslung suspension beam.

Referring now specifically to FIG. 7, an embodiment of the suspension beam is shown from below in perspective. The top plate 112 and bottom plate 118 extend from pivot mount 107 to spring end 106. The axle sleeve 126 is disposed between and attached to the top plate 112 and bottom plate 118 at a point substantially midway between the pivot mount 107 and spring end 106. The centerline of the beam created by the top and bottom plate 118 intersects the axis of rotation of the axle 124 disposed in axle sleeve 126.

Continuing to refer to FIG. 7, side plates 138 and 140 are attached to top plate 112, bottom plate 118 and axle sleeve 126. The side plates 138 and 140 are attached to top plate 112 and bottom plate 118 along a line substantially parallel to and recessed from the edges of the top plate 112 and the bottom plate 118. The side plates 138 and 140 are substantially perpendicular to the top and bottom plate. The side plates 138 and 140 may also be mounted flush to or outboard of the top and bottom plates.

Figure 8:
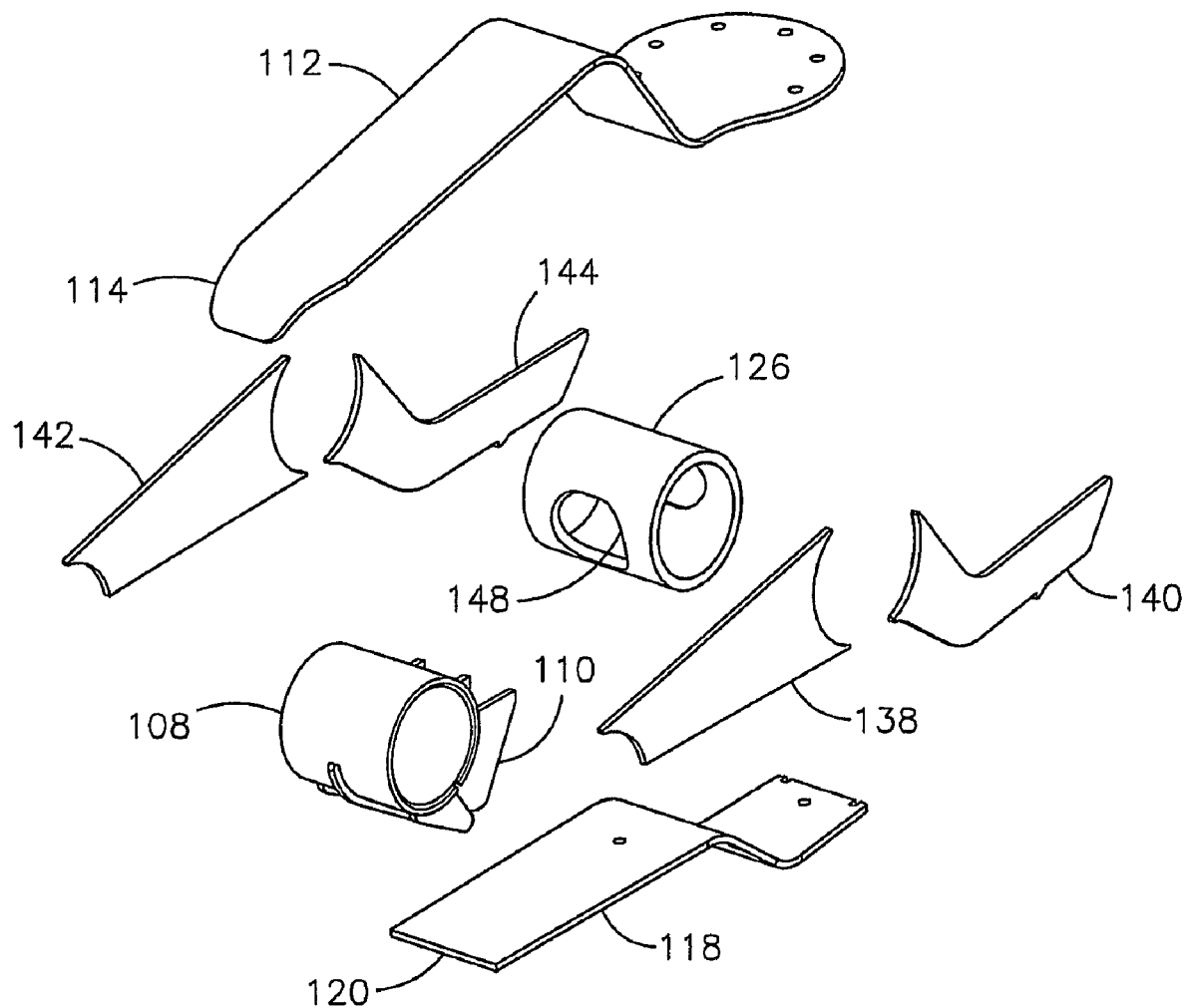
FIG. 8 is an exploded view of a third embodiment, showing an underslung suspension beam.

Referring now specifically to FIG. 8, the suspension beam 102 is shown in an exploded view. The top plate 112 and the bottom plate 118 are attached at pivot ends 114 and 120, respectively, to the bush housing 108. The top plate 112 and bottom plate 118 are attached at a point near their respective midpoints to an axle sleeve 126.

The axle sleeve 126 is substantially a circular cylinder with an inner circumference and an outer circumference and a length. The axle sleeve 126 substantially surrounds the circumference of the axle 101, and extends along the axle 101 beyond sidewalls 138, 140, 142 and 144 approximately to the edges of top plate 112 and bottom plate 118.

Axle sleeve 126 may also include one or more windows 148 disposed radially around the axle sleeve. In a preferred embodiment the axle sleeve includes two windows 148 disposed substantially opposed to each other on the exterior circumference of the sleeve, equidistant from either end of the cylinder along its length, and extending into the inner circumference, thereby forming two openings in axle sleeve 126. The windows 148 may be substantially circular, oval, or rectangular in shape. The windows 148 provide access to axle 101 through axle sleeve 126 for attaching the axle sleeve to the axle 124 by weldment or other conventional means.

It is understood that the axle sleeve 126 may first be attached to the axle 101 by weldment or other conventional means before it is positioned and fixed between the top plate 112 and bottom plate 118 of the suspension beam 102. However, the axle sleeve 126 may also be premounted to the suspension beam 102 in the method described above with the axle 101 later inserted into the axle sleeve 126 and fastened thereto.

In this embodiment, the pivot mount 107 includes a bush housing 108 and a bush retention clamp 110. The bush housing 108 is a circular cylinder divided by a slit extending the length of the bush housing, and allowing the bush housing 108 to flex slightly. The bush retention clamp 110 includes multiple metal flanges and is attached to the outside surface of the bush housing 108. The metal flanges are disposed on either side of the slit in the bush housing 108.

Figure 2:
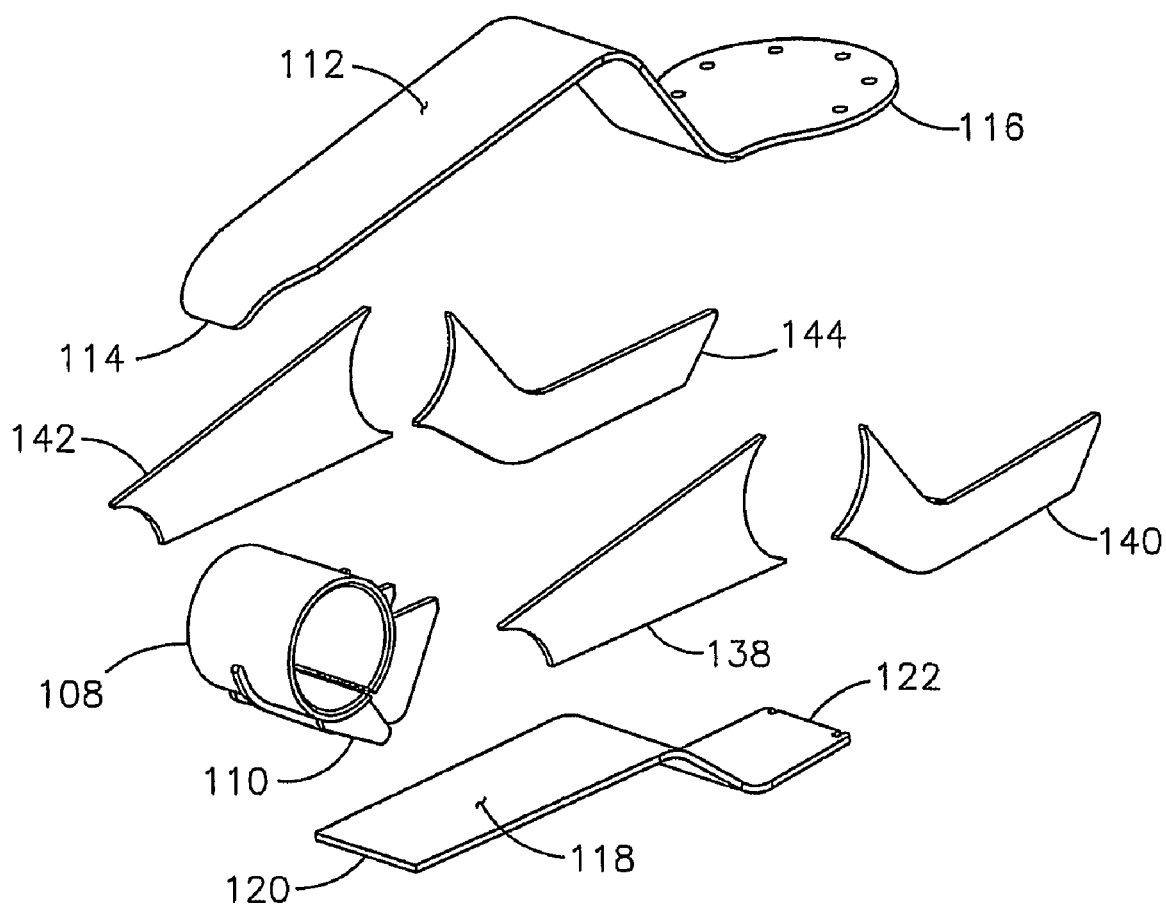
FIG. 2 is an exploded view of a first embodiment.
Figure 9:
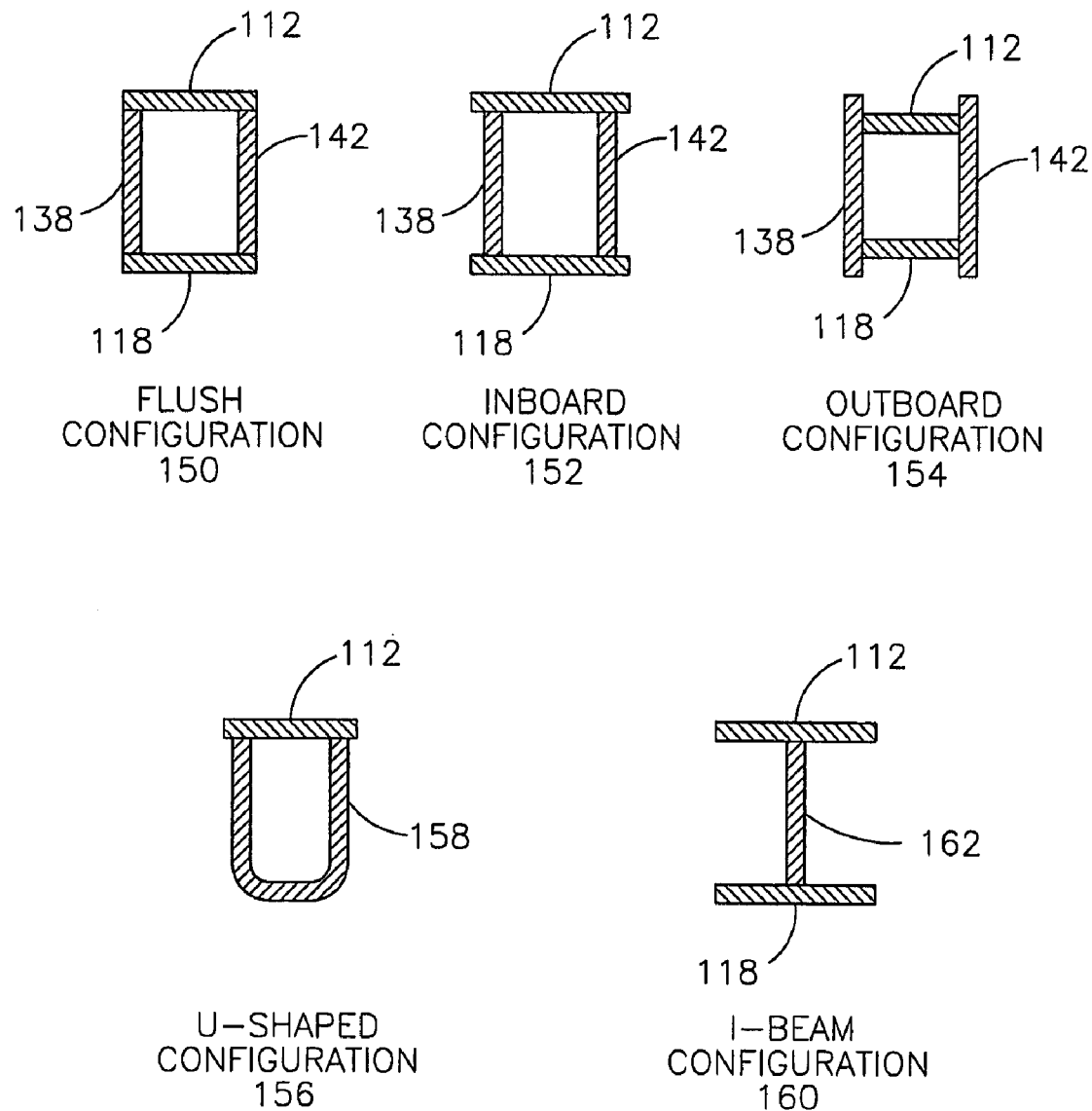
FIG. 9 is a cross-section view of a multiple suspension beams embodying differing sidewall configurations.

Referring now specifically to FIG. 9, multiple suspension beam sidewall embodiments are shown in cross-section. The side plates 138, 140, 142 and 144 shown in FIGS. 2, 5, and 8 among others, may in other embodiments be mounted flush, inboard or slightly outboard of the top plate 112 and bottom plate 118.

In a flush-mounted sidewall configuration 150 the top plate 112 and bottom plate 118 are attached to sidewalls 138 and 142 substantially along the edges of the top and bottom plates such that the outer surface of sidewalls 138 and 142 are flush with respect to the edges of top plate 112 and bottom plate 118. In a slight modification of this configuration, the sidewalls 138 and 142 may be attached to the top plate 112 and bottom plate 118 such that the top edge of sidewalls 138 and 142 are flush with respect to the top surface of top plate 112 and the bottom edge of sidewalls 138 and 142 are flush with respect to the bottom surface of bottom plate 118.

Continuing to refer to FIG. 9, an inboard-mounted sidewall configuration 152 includes top plate 112 and bottom plate 118 attached to sidewalls 138 and 142 at a line substantially parallel to and set back from the edge of top plate 112 and bottom plate 118. Top plate 112 and bottom plate 118 extend laterally beyond sidewalls 138 and 142 from between 2 and 10 mm.

Continuing to refer to FIG. 9, an outboard-mounted sidewall configuration 154 includes top plate 112 and bottom plate 118 attached to side surfaces of sidewalls 138 and 142. The top plate 112 and bottom plate 118 are attached to the sidewalls at a line substantially parallel to and recessed from the top and bottom edges of sidewalls 138 and 142. The sidewalls 138 and 142 extend above top plate 112 and below bottom plate 118 from between 2 and 10 mm.

Continuing to refer to FIG. 9, a u-shaped sidewall configuration 156 includes a top plate 112 and a u-shaped plate member 158. U-shaped plate member 158 consists of a plate formed along its length by bending or other similar methods to substantially form two sidewalls and an apex. In one embodiment of the suspension beam, the top plate 112 is attached to the edges of the sidewalls of the u-shaped member 156. In a similar embodiment, bottom plate 118 is attached to the edges of the sidewalls of the u-shaped member 158. The outer surface of sidewalls created by u-shaped member 158 may be recessed from, or substantially flush to, the edges of top plate 112 or bottom plate 118.

Continuing to refer to FIG. 9, an I-beam configuration 160 includes a top plate 112 and bottom plate 118, both attached to wall 162. The bottom surface of top plate 112 and the top surface of bottom plate 118 are attached to the edges of sidewall 160 substantially along the centerline of the top and bottom plates.

Figure 10:
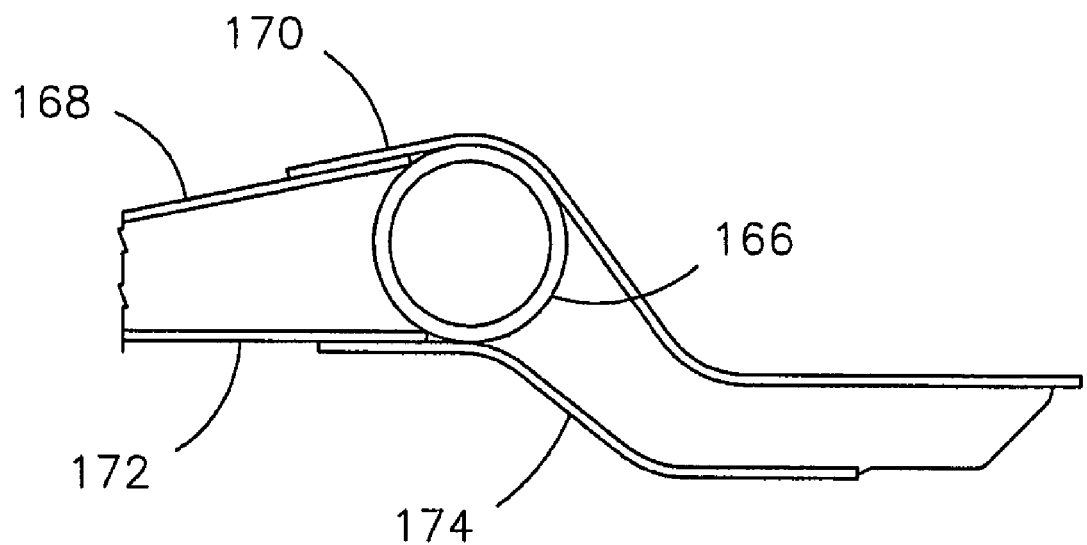
FIG. 10 is a partial side elevation of several embodiments including multiple top and bottom plates.
Figure 10:
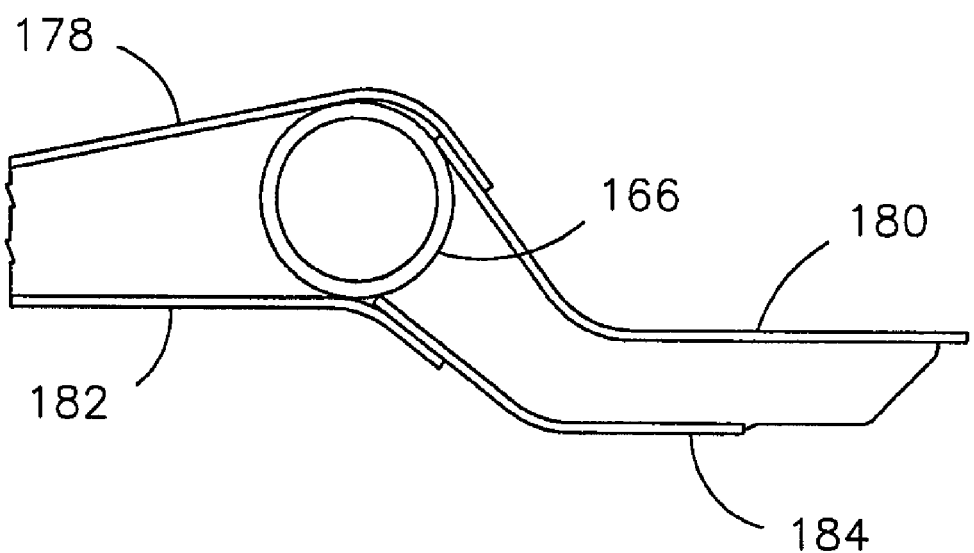

Referring now more specifically to FIG. 10, several embodiments including multiple top and bottom plates are shown in partial side elevation. In a first configuration 164, axle 166 may be either an axle or an axle sleeve for receiving an axle. In configuration 164, a first top plate 168 is attached to the axle 166 substantially along the front side of the top portion of axle 166 and extends in one lateral direction from the axle 166. A second top plate 170 overlaps and is attached to the top surface of the first top plate 168, and to the top surface of axle 166 extending from the edge of the first top plate 168 for some arc length along the circumference of the axle 166 as described in the other figures. The second top plate 170 extends laterally from the axle 166 in substantially the opposite direction from the first top plate 168.

Furthermore, in configuration 164 the axle 166 is also attached to the edge of a first bottom plate 172 along the front side of the bottom half of the axle 166. The first bottom plate 172 extends laterally in a direction substantially perpendicular to the axis of rotation of axle 166. A second bottom plate 174 overlaps and is attached to the bottom surface of the first bottom plate 172, and to the bottom surface of the axle 166. The attachment between the second bottom plate 174 and the axle 166 may extend along the surface of the axle 166.

Continuing to refer to FIG. 10, in a second multiple plate configuration 176 the top portion of the axle or axle sleeve 166 is attached to the bottom surface of a first top plate 178. The first top plate 178 overlaps and is attached to a second top plate 180. The edge of the second top plate 180 is also attached to back side of the top portion of the axle 166. The configuration 176 also includes a first bottom plate 182 attached to the bottom portion of axle 166 and overlapping and attached to a second bottom plate 184. The edge of the second bottom plate 184 is also attached to the back side of the bottom portion of the axle 166.

Continuing to refer to FIG. 10, other configurations include various combinations of the overlapping top and bottom plates to produce embodiments of the suspension beam. The combinations include a top plate element and a bottom plate element. The top plate elements of the combinations include either a single top plate, a first top plate overlapping a second top plate as described in configuration 176 above, or a second top plate overlapping a first top plate as described in configuration 164 above. The bottom plate elements include either a single bottom plate, a first bottom plate overlapping a second bottom plate as described in configuration 164, or a second bottom plate overlapping a first top plate as described in configuration 176. Each configuration is briefly described below.

There are many changes and modifications which can be made to Applicant's device which would be obvious to one of ordinary skill in the art and which are included in the scope of Applicant's invention. It is intended that Applicant's invention be limited only by the scope of the claims appended hereto.

What is claimed is:

1. A suspension beam assembly for an axle comprising two suspension beams, wherein each suspension beam comprises:
   a pivot mount,
   a top plate and a bottom plate each having a first end and a second end,
   a spring mount,
   and longitudinal plates,
   wherein the first end of the top plate and the first end of the bottom plate are attached to the pivot mount,
   wherein the second end of the top plate is attached to the spring mount,
   wherein the axle is disposed between and directly attached to the top plate and bottom plate at points located between the first and second ends thereof, and
   wherein the longitudinal plates are disposed along both lateral edges of and connected to the top and bottom plates between the axle and the pivot mount, and between the axle and the spring mount.

2. The suspension beam assembly of claim 1 wherein the top plate contacts the axle along an arc length subtended by an angle measured from the center of rotation of the axle and the point of first contact between the axle and the top plate;
   wherein the angle is between 0 and 90 degrees.

3. The suspension beam assembly of claim 1 wherein the bottom plate contacts the axle along an arc length subtended by an angle measured from the center of rotation of the axle and the point of first contact between the axle and the bottom plate;
   wherein the angle is between 0 and 90 degrees.

4. The suspension beam assembly of claim 1 wherein:
   the bottom plate contacts the axle along an arc length subtended by a first angle measured from the center of rotation of the axle and the point of first contact between the axle and the bottom plate;
   and the first angle is between 0 and 90 degrees;
   and the top plate contacts the axle along an arc length subtended by a second angle measured from the center of rotation of the axle and the point of first contact between the axle and the top plate;
   wherein the second angle is between 0 and 90 degrees.

5. A suspension beam assembly for an axle comprising two suspension beams, wherein each suspension beam comprises:
   a pivot mount including a bush housing and a bush housing clamp;
   a top plate and a bottom plate, each with a pivot end and a spring end;
   the axle disposed between and connected to the top and bottom plates at a point between the pivot end and spring end of the top and bottom plates;
   side plates disposed along both lateral edges of and connected to the top and bottom plates between the axle and the pivot end, and between the axle and the spring end;
   wherein the top and bottom plates are attached to the pivot mount at their respective pivot ends;
   wherein the side plates are substantially perpendicular to the top and bottom plates;
   and wherein the top and bottom plates are directly attached to the axle.

6. A suspension beam of claim 5 wherein the side plates are disposed flush to the edges of the top and bottom plates thereby creating a box structure.

7. A suspension beam of claim 5 wherein the side plates are recessed between the top and bottom plates, in an inboard configuration.

8. A suspension beam of claim 5 wherein the side plates extend above and below the top and bottom plates and are attached to the edges of the top and bottom plates, in an outboard configuration.

9. A suspension beam assembly for an axle comprising two suspension beams, wherein each suspension beam comprises:
- a pivot mount including a bush housing and a bush housing clamp;
- a top plate and a bottom plate, each with a pivot end and a spring end;
- the axle disposed between and connected to the top and bottom plates at a point between the pivot end and spring end of the top and bottom plates;
- side plates disposed along the center line of and connected to the top and bottom plates between the axle and the pivot end, and between the axle and the spring end;
- wherein the top and bottom plates are attached to the pivot mount at their respective pivot ends;
- wherein the side plates are substantially perpendicular to the top and bottom plates;
- and wherein the top and bottom plates are directly attached to the axle.

10. A suspension beam assembly for an axle comprising two suspension beams, wherein each suspension beam comprises:
- a pivot mount including a bush housing and a bush housing clamp;
- a top plate with a pivot end and a spring end;
- the axle connected to the top plate at a point between the pivot end and spring end of the top plate;
- a u-shaped plate connected to the top plate between the axle and the pivot end, and between the axle and the spring end;
- wherein the top plate is attached to the pivot mount at the pivot end;
- wherein the sides of the u-shaped plate are substantially perpendicular to the top plate;
- and wherein the top plate is directly attached to the axle.

11. A suspension beam assembly for an axle comprising two suspension beams, wherein each suspension beam comprises:
- a pivot mount including a bush housing and a bush housing clamp;
- a first top plate with a pivot end and an axle end;
- a second top plate with an axle end and a spring end;
- a bottom plate with a pivot end and a spring end;
- the axle disposed between and connected to the top and bottom plates; and
- longitudinal plates disposed along both lateral edges of and connected to the to and bottom plates between the axle and the pivot mount, and between the axle and a spring mount at the spring end;
- wherein the bottom plate is attached to the pivot mount at the pivot end and the spring mount at the spring end and to the axle at a point therebetween;
- wherein the first top plate is attached to the pivot mount at the pivot end and to the axle at the axle end;
- wherein the second top plate is attached to the axle at the axle end and the spring mount at the spring end;
- wherein the first top plate substantially overlaps the second top plate above the axle;
- and wherein the top and bottom plates are directly attached to the axle.

12. A suspension beam assembly for an axle comprising two suspension beams, wherein each suspension beam comprises:
- a pivot mount including a bush housing and a bush housing clamp;
- a first bottom plate with a pivot end and an axle end;
- a second bottom plate with an axle end and a spring end;
- a top plate with a pivot end and a spring end;
- the axle disposed between and connected to the top and bottom plates; and
- longitudinal plates disposed along both lateral edges of and connected to the top and bottom plates between the axle and the pivot mount, and between the axle and a spring mount at the spring end;
- wherein the top plate is attached to the pivot mount at the pivot end and the spring mount at the spring end and to the axle at a point therebetween;
- wherein the first bottom plate is attached to the pivot mount at the pivot end and to the axle at the axle end;
- wherein the second bottom plate is attached to the axle at the axle end and the spring mount at the spring end;
- wherein the first bottom plate substantially overlaps the second bottom plate below the axle;
- and wherein the top and bottom plates are directly attached to the axle.

13. A suspension beam assembly for an axle comprising two suspension beams, wherein each suspension beam comprises:
- a pivot mount including a bush housing and a bush housing clamp;
- a first top plate with a pivot end and an axle end;
- a second top plate with an axle end and a spring end;
- a first bottom plate with a pivot end and an axle end;
- a second bottom plate with an axle end and a spring end;
- the axle disposed between and connected to the top and bottom plates; and
- longitudinal plates disposed along both lateral edges of and connected to the top and bottom plates between the axle and the pivot mount, and between the axle and a spring mount at the spring end;
- wherein the first top plate is attached to the pivot mount at the pivot end and to the axle at the axle ends;
- wherein the second top plate is attached to the axle at the axle end and the spring mount at the spring end;
- wherein the first top plate substantially overlaps the second top plate above the axle;
- wherein the first bottom plate is attached to the pivot mount at the pivot end and to the axle at the axle ends;
- wherein the second bottom plate is attached to the axle at the axle end and the spring mount at the spring end;
- wherein the first bottom plate substantially overlaps the second bottom plate below the axle;
- and wherein the top and bottom plates are directly attached to the axle.

* * * * *